Nov. 18, 1941.                C. H. ZIMMERMAN                    2,263,231
                                CUTTING TOOL
                             Filed Dec. 7, 1939           2 Sheets-Sheet 1
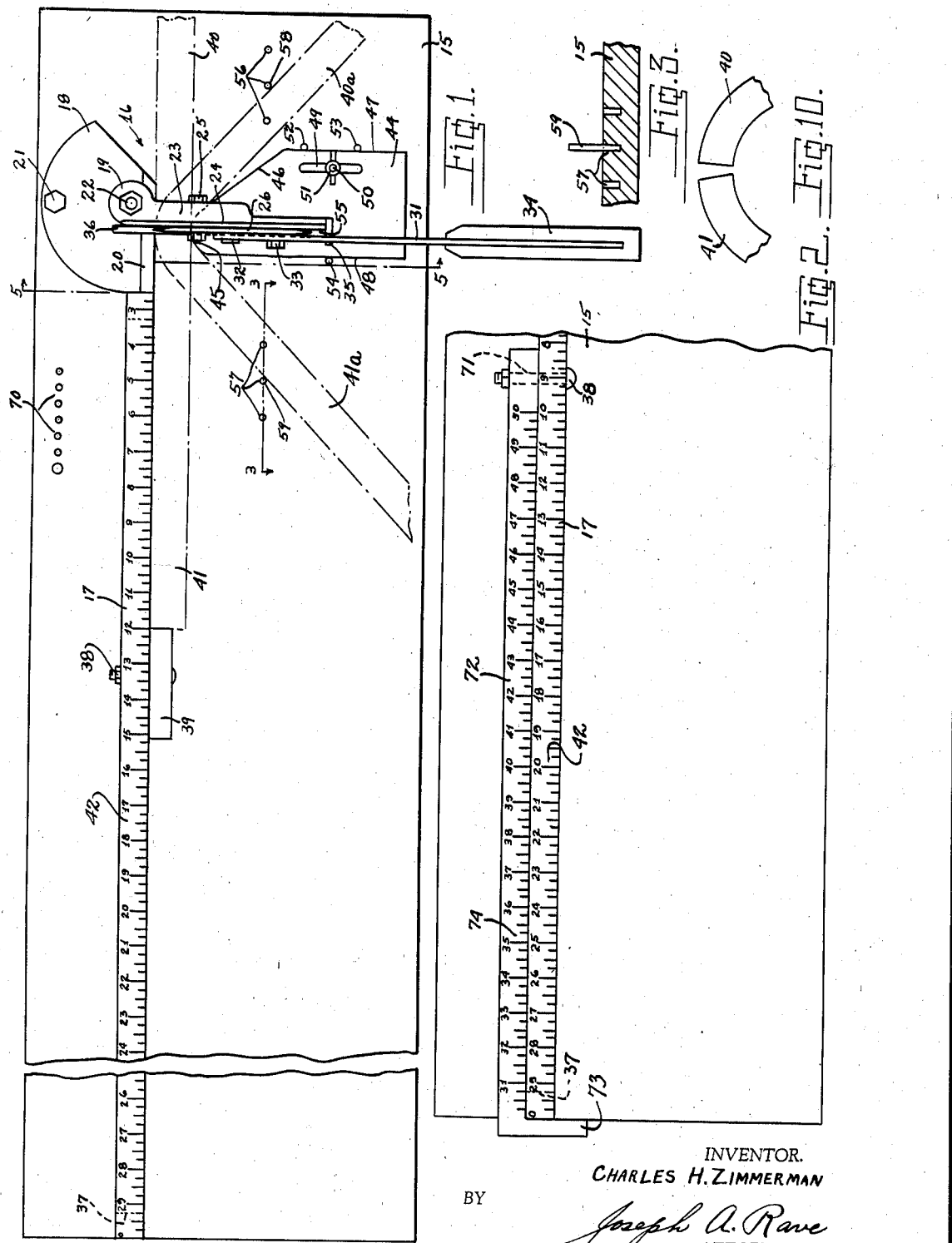
INVENTOR.
CHARLES H. ZIMMERMAN
BY
Joseph A. Rave
ATTORNEY.

Nov. 18, 1941.  C. H. ZIMMERMAN  2,263,231
CUTTING TOOL
Filed Dec. 7, 1939  2 Sheets-Sheet 2
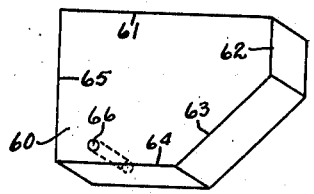
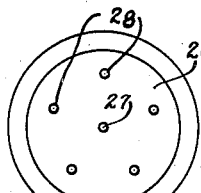
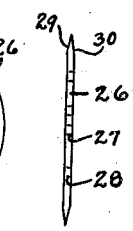
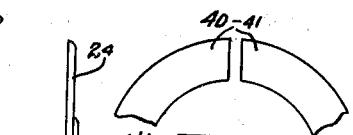
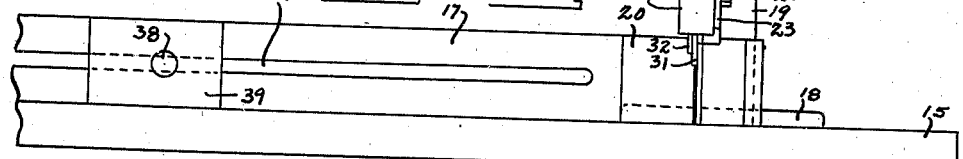
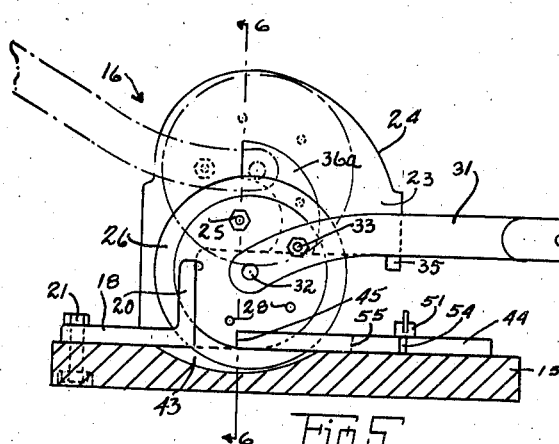
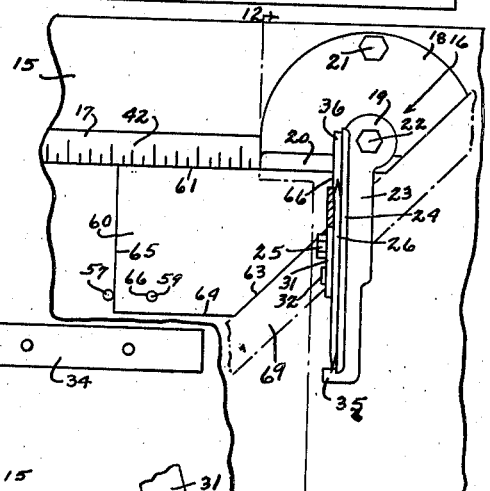
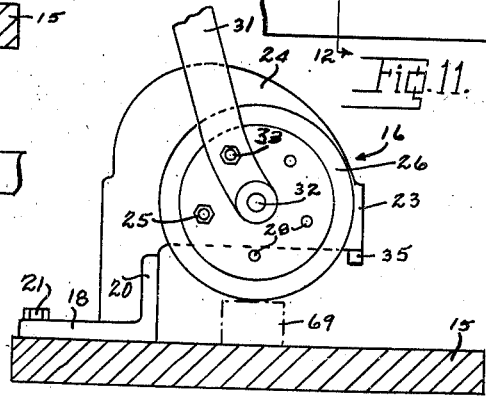
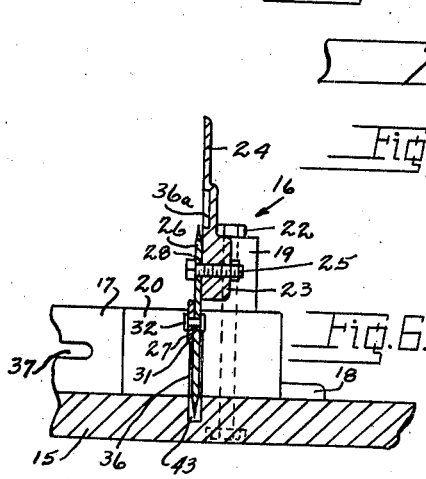
INVENTOR.
CHARLES H. ZIMMERMAN
BY
Joseph A. Rave
ATTORNEY.

Patented Nov. 18, 1941

2,263,231

UNITED STATES PATENT OFFICE 2,263,231

CUTTING TOOL

Charles H. Zimmerman, Norwood, Ohio

Application December 7, 1939, Serial No. 308,042

5 Claims. (Cl. 164—44)

This invention relates to improvements in a cutting tool, and particularly to a cutting tool for cutting off a plurality of lengths from a strip, such as packing material used for packing around shafts, plungers, bars such as used in elevators and steam ships and the like.

In the packing of joints such as enumerated above, the material comes in a roll or on a spool and is cut to a length which will encircle what is being packed. In such joints, the number of such strips used is determined by the depth of the stuffing box or other packing material enclosure. In the past, it has been customary to use a knife, chisel and mallet, or other sharp instrument for severing the packing material into lengths, after each length had been separately and individually measured. With this type of cutting, the ends of the material cut would be anything but square, since there was nothing to prevent the knife, chisel, or other cutting implement from twisting or skewing while passing through the material. With the cutting tool of this invention, all these difficulties are eliminated.

It is therefore one of the principal objects of the present invention to provide a cutting tool particularly adapted for cutting strip packing material into lengths whereby each length is identical with the other, and the ends of the strips are true or perpendicular to the length.

Another object of this invention is to provide a packing material cutter which will easily and readily cut said material, whether it be of comparatively soft texture, dense, with or without a metallic core.

Another object of this invention is the provision of a cutting tool for the purpose indicated, which will provide the ends of strips of said packing material with such an angle that, when arranged around the member being packed, the said abutting ends will be parallel.

Another object of this invention is to provide a cutting tool which will readily, and without effort, cut packing material into lengths with the opposite ends of the material length complementary to one another, when at any desired face angle or inclination.

Other objects and advantages of the present invention should be readily apparent by reference to the following specification considered in conjunction with the accompanying drawings forming a part thereof, and it is to be understood that any modifications may be made in the exact structural details there shown and described, within the scope of the appended claims, without departing from or exceeding the spirit of the invention.

In the drawings:

Fig. 1 is a top plan view of the cutting tool of this invention.

Fig. 2 is a plan view of the rear end of the cutting tool, showing the edge of an extension thereto, whereby lengths beyond the normal capacity of the tool base may be accommodated and produced.

Fig. 3 is a fragmentary, sectional view through a portion of the tool, taken on line 3—3 of Fig. 1.

Fig. 4 is an elevational view of the right-hand view of Fig. 1.

Fig. 5 is a transverse, sectional view, taken on line 5—5 of Fig. 1.

Fig. 6 is a sectional view, taken at right angles to Fig. 5, on line 6—6 on said Fig. 5.

Figs. 7 and 8 are respectively a plan and an elevational view of the cutter disc used with the cutting tool and forming a detail of the invention.

Fig. 9 is a fragmentary view of a strip of packing material, showing the opposed ends of said strip when cut on the cutting tool of this invention.

Fig. 10 is a view similar to Fig. 9, showing a strip of packing material arranged around the member being packed, and illustrating the position of the opposed ends of said strip when cut by the methods employed in the past.

Fig. 11 is a plan view of some of the parts of Fig. 1, showing the cutter tool in position for cutting the packing material, with the ends thereof at an angle other than a right angle.

Fig. 12 is a transverse, sectional view, taken on line 12—12 of Fig. 11.

Fig. 13 is a perspective view of a block or member utilized with the cutting tool when making the face cuts as in Figs. 11 and 12; and, Fig. 14 is a view showing a strip of packing material with the opposed ends parallel to one another and at an angle to the axis of the member packed.

Throughout the several views of the drawings, the same or similar reference characters are employed to denote the same or similar parts.

The cutting tool of this invention comprises a base plate or member 15, shown in the drawings as rectangular in shape, and of a solid cross section. It will be understood of course that the base member 15 may be narrowed in width through a portion of its length, and of skeleton or hollowed out cross section. Secured to one end, preferably the right end, of the base is the cutting mechanism, indicated in general by the reference character 16, from which extends the guide and measuring bar 17.

The cutting mechanism 16 comprises a casting having a flange 18, an upstanding post 19 and a face plate 20. The casting is secured to the base 15 by means of bolts 21 and 22, respectively passing through the flange 18 and the post 19, with the face plate 20 at right angles to the upper surface 15, as seen clearly in Fig. 5. Projecting from the post 19, and overlying the base plate 15, is an arm 23, provided upwardly thereof with a guard 24. The arm 23, forwardly of the post 19, is provided with an aperture in which is threaded or otherwise secured a stud, bolt or the like 25.

Mounted on the bolt, stud or the like 25, is a disc cutter or knife 26, illustrated most clearly in Figs. 7 and 8, which, as shown in said figures, is provided axially thereof with an aperture 27, and a plurality of apertures 28 equally spaced from the axial aperture 27 and equally spaced from one another. The periphery of the disc 26 is sharpened by beveling each side thereof as indicated at 29 and 30 on Fig. 8.

It is one of the apertures 28 through which the bolt, stud or the like 25 passes for attaching the cutter to the arm 23, and said bolt, stud or the like 25 acts as an axle for the cutter. In order to actuate the cutter about the axle 25, use is made of a lever or arm 31, which has its inner end provided with an aperture disposed in axial alignment with the axial aperture 27 of the cutter 26, and through which apertures a rivet 32 is passed. It should be noted at this time that the rivet connection 32 is such that the cutter may be rotated independently of the arm or lever 31, for a purpose later to be described. In order to secure the lever 31 to the disc cutter 26, the said lever is provided with a second aperture adapted to be aligned with one of the apertures 28 not being used by the axle 25, and through which aligned apertures, a bolt or the like 33 is passed. The outer end of the lever 31 has secured to it an enlargement 34, to provide a handle for the comfort of the operator.

To limit the movement of the lever 31, and thereby the cutter disc 26, in a clock-wise direction, which, incidentally, is the cutting direction of the cutter, the outer end of the arm 23 is provided with a lug 35, against which the lever 31 abuts. It should be noted at this time that the face plate 20 is provided, adjacent the post 19 and in alignment with the vertical face of the arm 23 and guard 24, with a slot 36, into which the cutter disc passes when effecting a cut through the packing material. The normal movement of the cutter disc 26 and lever 31 is from the solid line position of Fig. 5 to the dotted line position thereof, which is substantially 180°, and in order to accommodate the heads of the rivet 32 and clamping bolt 33 on the right hand side of the cutter disc, as seen in Figs. 1 and 4, the arm 23 and guard 24 are provided with a channel 36.

The guide and measuring bar 17 extends from the left hand end of the face plate 20 to the left hand end of the base plate 15, and is provided with graduations measured from the edge of the cutter when in final cutting position, illustrated in Figs. 1 and 5. As will readily be seen from Fig. 1, the forward edge of the bar 17 is in alignment with the face plate 20, and, as was noted above, is secured to the base plate 15. The bar 17, see Fig. 4, is provided centrally thereof with an elongated aperture 37, through which passes a suitable clamping bolt 38. The clamping bolt 38 also passes through, or may be secured to and project from, a stop or gauge block 39, mounted adjacent the forward face of the bar 17. As will be noted, particularly from Figs. 1 and 4, the clamp bolt 38 is off center with respect to the length of the block 39. In this way, the block 39 may be turned end for end, to have, in one instance, the face of the block at the zero point of the gauge, or adjacent the cutter disc; while, in the other instance, and when at the left hand end of the bar 17, will give a maximum length that can be cut.

The operation of the cutting tool as thus far described is as follows:

A piece of packing material is illustrated by dot and dash lines in Fig. 1, and it is presumed that the portion 40, on the right hand side of the cutting mechanism 16, of such a strip of material is attached to and part of a coil, while the portion 41 of the material on the left hand side of the cutter mechanism 16 is the length to be cut. After determining the length 41, the stop 39 is positioned in accordance with the scale 42 on the bar 17, and secured in this position by the clamp bolt 38. The material is then placed in the position indicated by the reference characters 41 and 40, whereupon the arm 31 is actuated from the dotted line position of Fig. 5 to the solid line position for correspondingly actuating the cutter disc 26. This movement of the cutter disc causes it to pass through the material, as well as enter and pass through the groove 43 in the base plate 15 and the slot 36 in the face plate 20.

After the severance of the portion 41 from the portion 40 of the coil or reel, the arm 31 and cutter disc 26 will be returned to their dotted line position, thereby again clearing the throat of the cutter mechanism. The portion 40 of the material is then fed through the cutter throat below the cutter disc 26 into engagement with the gauge block 39, whereupon the cutter is again actuated. It will be appreciated that the material is positioned so as to firmly rest on the upper surface of the base plate 15 and the forward surface of the gauge box 17 and face plate 20. The above operations are repeated until the required number of lengths or strips 41 are obtained, whereupon they are placed around the shaft or bar, and within the stuffing box or closure member.

By cutting these strips as just described, the ends of the strips, and their faces, are at right angles to the length of the strip and perpendicular to the upper surface of the base plate 15. When these strips are packed around any shaft, bar or the like other than a square, the opposing faces of the ends of the strips bear the relation as illustrated in Fig. 10, which is not the most desirable, since the spacing between the ends should be uniform, so that a true and square abutment is obtained when these strips are drawn towards one another as by expansion, or stretched while being compressed and packed.

In order to eliminate the undesirable condition illustrated in Fig. 10, and obtain the desired condition illustrated in Fig. 9, use is made of a gauge and cutting block 44, shown in Fig. 1 as of generally rectangular area with a substantially rounded joint 45 at one end thereof, from which an inclined portion 46 extends to the one side portion 47. A second side portion 48 extends straight down from the rounded nose 45. In order to take care of different widths and sizes of packing material, the gauge member 44 is provided within its boundaries with a slot 49, through which projects a bolt 50 which upstands from the upper surface of the base plate 15. Mounted on the bolt 50 is a thumb nut 51, which clampingly secures the member 44 in position. In order to guide the gauge and cutting block 44 in its movement towards and from the face plate 20, there is provided a pair of pins 52 and 53, against which the side 47 of the block slides. Opposed to the pins 52 and 53 is a third pin 54, adapted to have sliding engagement with the side 48 of the block. It will be readily seen that the pins 52, 53 and 54 form a sliding track for the block 44. It should also be noted that the gauge and cutting block 44 is provided therethrough, beneath the cutter disc 26, with a slot 55 for the passage of said cutter blade.

On each side of the gauge and cutting block 44, the base plate is preferably provided with sets of sockets 56 and 57, adapted to receive a pin. As illustrated in Figs. 1 and 3, the center socket of each set has therein a pin 58 and 59. These pins are readily removable and insertable in the other sockets of their sets.

In order to cut the strips 41 so that their opposed faces bear the relation illustrated in Fig. 9, the portion 40 of the strip, after being measured, is placed ahead of the pin 59, as illustrated in Fig. 1 by the reference numeral 41—a, while the portion 40 of the strip is placed ahead of the pin 58, as illustrated at 40—a. With the packing material in this position, the portion thereof immediately beneath the cutter disc 26 is bent around the rounded nose 45 of the gauge and cutter block 44. In this way, the material is forced to take a position somewhat analogous to that it would have when arranged around a shaft, bar, plunger or the like, so that when said strips are mounted in position, the opposed end faces thereof are parallel to one another.

As will be readily understood, only a comparatively short portion of the cutting edge of the disc is employed for severing the strip into sections with the parts mounted as shown in the drawings. It has been found that approximately one fifth (⅕) of the cutting edge is so used at any one setting of the parts. By providing the cutter disc with five apertures, such as 28, equally spaced from one another and from the center aperture 27, the active portion of the cutter disc may be shifted when one portion thereof becomes worn and dull. In order to do this, the cutter disc 26 is removed from the axle 25 and the clamping or locking bolt 33 removed to release the lever 31. The lever 31 is then advanced about the axis of the pivot 32 to the next aperture 28, whereupon the clamping bolt 33 is replaced to secure the lever 31 to the cutter disc. The cutter disc is then remounted on the axle 25, using the aperture 28 next ahead of the aperture previously mounted on the axle. By this construction, there has been provided a cutter assembly which can readily be changed to provide a new cutting edge for the worn, dull edge, or, in other words, a cutter disc which can readily be manufactured and ground to a sharp edge, since the edge is perfectly circular, and which cutter disc has a plurality of instantly usable cutting portions.

The foregoing description dealt with a cutting tool for cutting strips to make a ring packing when the opposed faces of the strips are parallel to one another when in operative position. It frequently happens that it is desired to have these faces parallel to one another but not perpendicular to the axis of the member being packed, but, instead, at an angle to the axis of the member being packed. This angle of inclination is frequently 45°, whereby the opening between the ends of the material are overlapped as respects the inner and outer diameters when in position, as illustrated in Fig. 14. It has been found that to attempt to cut with an oscillating motion of the cutter, so that the thrust would be against the face plate 20, the packing material shifted and a cut at an angle other than the desired angle resulted. It was found, however, that by cutting down through the material, the desired resulting angle was obtained.

In order to adapt the cutting tool of this invention to accomplish this result, the gauge and cutting block 44 is removed, and in its place a backing up block substituted. The backing up block, as indicated in the drawings by the reference character 60, and as shown in Fig. 13, has a straight rear edge 61, a short right angle face 62, an inclined face 63, a comparatively short front straight edge 64 and a straight portion 65 connecting the edges 61 and 64. Near one end of the block, there is provided an aperture 66, through which projects a pin for positioning the same. This positioning pin may conveniently be the pin 59 and the aperture 66 is therefore positioned in the block 60 to align with one of the sockets 57. As will be seen in Fig. 11, when the block 60 is in operative position, its edge or face 61 is abutted against the forward face of the guide and measuring bar 17. With the block 60 in this position, the aces or portions 62 and 63 bear such a relation to the cutter mechanism 16 as to have the center of the packing material, illustrated in dot and dash lines in Figs. 11 and 12 and indicated by the reference character 69, immediately below the center of the cutter disc 26.

With the parts in this position, the cutter is operated from the position illustrated in Fig. 12 to that illustrated in solid lines in Fig. 5, causing the cutter disc to penetrate and pass through the cutting material, with the cutting thrust taken by the base plate 15, instead of by the face plate as above described. The resulting cut provides strips of packing material with their end faces on an angle complementary to the angle of the face or portion 63 of the block 64, so that when the said strips are placed around a member to be packed, the opposed faces thereof are parallel to one another but extend at an angle to the axis of the member.

In order to prevent loss and misplacement of the bolts and pins removed from Fig. 1 in order to position the backing up block 60, the base plate 15 is provided with a plurality of sockets 70 adapted to receive the pins 52, 53, 54, 58 and 59, as well as the clamping bolt 50. Likewise, the clamping bolt 50 is kept in one of these sockets when the cutting tool is set up, as in Fig. 11.

It will be understood, of course, that the length of the base member 15 may be made as desired, and that accordingly the measuring bar 17 will vary in length. The set up as illustrated in Fig. 1 will take care of the majority of cases, as it will handle all members to be packed requiring a length of packing material up to approximately 30" in length. As a matter of fact, the base plate 15 could be cut off just to the left of the cutting mechanism as illustrated in Fig. 1, and any type of measuring stick used to measure the individual lengths as they are needed. Preferably, however, the cutting tool is to be built as illustrated as Fig. 1, with an attachment or extension for obtaining lengths beyond the capacities of the normal machine, and such a structure is illustrated in Fig. 2. As seen in Fig. 2, the stop block 39 is removed and the clamping bolt 38 passed directly through the elongated slot 37 in the measuring bar 17. The projecting end of the clamping bolt 38 passes through an aperture 71 in one end of an extension bar 72. The opposite end of the extension bar 72 has integral therewith and secured thereto a lug 73 which acts in place of the stop 39 for obtaining lengths of strips to be cut beyond the capacity of the normal measuring bar 17. To readily obtain the desired lengths, the extension bar 72 is provided with graduations and indicia 74, starting where the normal measuring bar stops, thereby enabling the cutting tool to be set up for direct reading.

From the foregoing, it will now be appreciated that there has been provided a cutting tool for cutting strips of material, such as strips for making the so-called ring packing, which can be expeditiously accomplished and have the opposed ends in proper parallel relation to one another.

What is claimed is:

1. In a cutting tool of the class described the combination of a base member, a casting secured to the base member and having an up-standing post, a face plate and an arm projecting from the post, said face plate extending normal to the base member and together forming a throat for strip packing material to be cut, a circular cutter eccentrically mounted on the arm above the face plate for oscillating movement relative to the arm and across the base member and face plate for severing the packing material on the base member and against the face plate, means for oscillating the cutter, and means associated with the base member and opposed to the face plate for arranging the packing material prior to the severing thereof in a position substantially analogous to the position it will assume when in operative position so that the opposed end faces of the packing strip are then parallel.

2. In a cutting tool of the class described the combination of a base member, a casting secured to the base member and having an up-standing post, a face plate and an arm projecting from the post, said face plate extending normal to the base member and together forming a throat for strip packing material to be cut, a circular cutter eccentrically mounted on the arm above the face plate for oscillating movement relative to the arm and across the base member and face plate for severing the packing material on the base member and against the face plate, means for oscillating the cutter, a packing strip arranging member on the base member and having a rounded nose disposed in opposition to the face plate and around which rounded nose the packing strip is disposed prior to the severing thereof, and a pair of pins one on each side of the arranging member for holding the strip packing material in position around the rounded nose.

3. In a cutting tool of the class described the combination of a base member, a casting secured to the base member and having an up-standing post, a face plate and an arm projecting from the post, said face plate extending normal to the base member and together forming a throat for strip packing material to be cut, a circular cutter eccentrically mounted on the arm above the face plate for oscillating movement relative to the arm and across the base member and face plate for severing the packing material on the base member and against the face plate, means for oscillating the cutter, a packing strip arranging member on the base member and having a rounded nose disposed in opposition to the face plate and around which rounded nose the packing strip is disposed prior to the severing thereof, and a pair of pins one on each side of the arranging member for holding the strip packing material in position around the rounded nose, said arranging member being mounted for longitudinal adjustment on the base member toward and from the face plate to accommodate different sizes of packing stripping material, and means carried by the base member for guiding the arranging member during its adjustment and for securing the arranging member in adjusted positions.

4. In a cutting tool of the class described the combination of a base member, a casting secured to the base member and having an up-standing post, a face plate and an arm projecting from the post, said face plate extending normal to the base member and together forming a throat for strip packing material to be cut, a circular cutter eccentrically mounted on the arm above the face plate for oscillating movement relative to the arm and across the base member and face plate for severing the packing material on the base member and against the face plate, means for oscillating the cutter, and means on said base member cooperating with the casting face plate for backing up and positioning the strip packing material with its longitudinal axis immediately below the center of the cutter and extending at an angle other than 90° to the plane of movement of the cutter.

5. In a cutting tool of the class described the combination of a base member, a casting secured to the base member and having an up-standing post, a face plate and an arm projecting from the post, said face plate extending normal to the base member and together forming a throat for strip packing material to be cut, a circular cutter eccentrically mounted on the arm above the face plate for oscillating movement relative to the arm and across the base member and face plate for severing the packing material on the base member and against the face plate, means for oscillating the cutter, and a backing up and position block or said base member having a portion contacting the casting face plate and a portion forwardly thereof and angularly related thereto to form a strip packing material positioning face whereby the longitudinal axis of the strip material is arranged at an angle other than 90° to the plane of movement of the cutter and substantially immediately below the center of the cutter and whereby the cutting thrust is transferred through the backing up and positioning block to the casting face plate.

CHARLES H. ZIMMERMAN.